United States Patent
Lin et al.

(10) Patent No.: US 9,330,098 B2
(45) Date of Patent: May 3, 2016

(54) USER INTERFACE OPERATING METHOD AND ELECTRONIC DEVICE WITH THE USER INTERFACE AND PROGRAM PRODUCT STORING PROGRAM FOR OPERATING THE USER INTERFACE

(71) Applicant: INDUSTRIAL TECHNOLOGY RESEARCH INSTITUTE, Hsinchu (TW)

(72) Inventors: Kuei-Hong Lin, Hsinchu (TW); De-Hui Shiue, Hsinchu (TW); Hsiang-Pei Tseng, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 7 days.

(21) Appl. No.: 13/727,513

(22) Filed: Dec. 26, 2012

(65) Prior Publication Data
US 2014/0101188 A1 Apr. 10, 2014

(30) Foreign Application Priority Data
Oct. 9, 2012 (TW) .............................. 101137227 A (51) Int. Cl.
*G06F 7/00* (2006.01)
*G06F 17/30* (2006.01)

(52) U.S. Cl.
CPC ...... *G06F 17/30023* (2013.01); *G06F 17/3005* (2013.01); *G06F 17/30038* (2013.01); *G06F 17/30058* (2013.01); *G06F 17/30064* (2013.01)

(58) Field of Classification Search
None
See application file for complete search history.

(56) References Cited

U.S. PATENT DOCUMENTS

| | | | |
|---|---|---|---|
| 6,848,004 B1 * | 1/2005 | Chang et al. | ................... 709/232 |
| 7,657,849 B2 | 2/2010 | Chaudhri et al. | |
| 7,752,083 B2 | 7/2010 | Johnson et al. | |
| 8,166,500 B2 | 4/2012 | Sakhartov et al. | |

(Continued)

FOREIGN PATENT DOCUMENTS

| | | |
|---|---|---|
| TW | 200912785 A | 3/2009 |
| TW | 201137781 A1 | 11/2011 |
| TW | 201216189 A1 | 4/2012 |

OTHER PUBLICATIONS

Mu et al., "Enriched Video Semantic Metadata: Authorization, Integration, and Presentation", ASIST 2003 Annual Meeting, pp. 316-322, 2003.*

(Continued)

*Primary Examiner* — Michael Hicks
(74) *Attorney, Agent, or Firm* — Muncy, Geissler, Olds & Lowe, P.C.

(57) ABSTRACT

A user interface operating method, an electronic device with the user interface and a program product storing a program for operating the user interface are disclosed. A user interface operating method includes steps of displaying a time image, a multimedia object corresponding to a time point in the time image, and first information of the multimedia object corresponding to the time point on a user interface of an electronic device; triggering a search process if the time image and the multimedia object corresponding to the time point in the time image overlap with each other on the user interface, the search process including searching for, based on the first information, multimedia objects corresponding to other time points in the time image related to the first information; and displaying on the user interface the multimedia objects corresponding to other time points in the time image and found in the search process.

15 Claims, 9 Drawing Sheets

(56) References Cited

U.S. PATENT DOCUMENTS

| | | | |
|---|---|---|---|
| 2006/0143664 | A1 | 6/2006 | Hartselle et al. |
| 2006/0282776 | A1* | 12/2006 | Farmer et al. ............. 715/719 |
| 2007/0203942 | A1* | 8/2007 | Hua et al. ............... 707/104.1 |
| 2008/0089551 | A1 | 4/2008 | Heather et al. |
| 2010/0325667 | A1 | 12/2010 | Lee et al. |
| 2012/0144330 | A1 | 6/2012 | Flint |
| 2013/0124990 | A1* | 5/2013 | Lettau ..................... 715/716 |

OTHER PUBLICATIONS

Carsado et al., "Hyperlinked Video With Moving Objects in Digital Televisions", Multimedia and Expo, 2005, ICME 2005, pp. 386-489, 2005, IEEE.*

Goularte et al., "Context-aware support in structured documents for interactive-TV", Multimedia Systems 11(4), pp. 367-382, 2006, Springer Verlag.*

Shamma et al., "Watch What I Watch Using Community Activity to Understand Content," Proc. of the ACM Int'l Multimedia Conf & Exhibition, pp. 275-284 (2007).

You et al., "TOPS Television Object Promoting System," Adjunct-Proc. of 24th Ann. ACM Symp. on User Interface Software & Tech., pp. 55-56 (2011).

Goularte et al., "Context-aware Support in Structured Documents for Interactive-TV," Multimedia Systems, pp. 367-382 (2006).

Guenther et al., "Interactive TV Services on Mobile Devices," IEEE Multimedia, pp. 72-76 (2008).

Bradshaw et al., "Guiding People to Information Providing an Interface to a Digital Library Using Reference as a Basis for Indexing," Proc. of Int'l Conf. on Intelligent User Interfaces, pp. 37-43 (2000).

Chang et al., "Smartphone for Mobile Commerce," Computer Standards and Interfaces, pp. 740-747 (2009).

\* cited by examiner

USER INTERFACE OPERATING METHOD AND ELECTRONIC DEVICE WITH THE USER INTERFACE AND PROGRAM PRODUCT STORING PROGRAM FOR OPERATING THE USER INTERFACE

CROSS-REFERENCE TO RELATED APPLICATIONS

This application claimed priority to Taiwanese Patent Application No. 101137227, filed on Oct. 9, 2012. The entirety of the above-mentioned patent application is hereby incorporated by reference herein and made a part of this specification.

FIELD

The present disclosure relates to a user interface operating method, an electronic device with the user interface and a program product storing a program for operating the user interface.

BACKGROUND

Embedded marketing involves repeatedly placing a product in a context (such as a show or a program) to strengthen the impression of the audience for the product. By blending the product into the show or conversations therein, it may raise the audience's interest for the product. However, when the audience wishes to know more about a particular product, they can only do so by later looking at reports or discussions in print media or the Internet. Thus, there is a need to access comprehensive real time information.

Currently, a QR code for a product can be displayed on the TV screen at the same time the product appears in the program, which allows a user to take a photo of the QR code using a mobile phone to obtain the URL (Uniform Resource Locator) of a web page containing more information about the product. However, this method loses the sense of implicitly of embedded marketing. Also, a TV screen filled with QR codes may affect the enjoyment of the audience watching the show, and such a blunt and direct selling technique may even cause aversion towards the product in some audiences.

Moreover, with the evolution of smart phones, in addition to placing marketing messages in shows and programs, smart phone applications are now often used for marketing purposes as well. For example, contents described in a food program are recorded and shared by using an application, so viewers can obtain information needed by inquiring the application after watching the program. The audience does not have to search the contents of interest on the Internet by themselves. Instead, they can obtain relatively comprehensive information by simply inquiring the application. However, the application usually presents contents that were introduced in the program in a textual format, which may prove to be difficult for the audience to recall the context of program, and even as to which particular product he/she was interested at the time of watching the program.

Therefore, there is a need in the field to develop a method for enabling the audience to readily obtain information about a product or a service during or after watching a show, which has the product or the service embedded therein.

SUMMARY

The present disclosure provides a user interface operating method. In an exemplary embodiment, the user interface operating method includes the following steps of displaying a time image, a multimedia object corresponding to a time point in the time image, and first information of the multimedia object corresponding to the time point on a user interface of an electronic device; triggering a search process if the time image and the multimedia object corresponding to the time point in the time image overlap with each other on the user interface, wherein the search process includes searching for, based on the first information, multimedia objects corresponding to other time points in the time image related to the first information; and displaying on the user interface the multimedia objects corresponding to other time points in the time image found in the search process.

The present disclosure also provides a program product storing a program for operating a user interface, and when the program product is loaded and executed on a computer, the aforementioned user interface operating method is performed.

Further, the present disclosure provides an electronic device with a user interface. In an exemplary embodiment, the electronic device with the user interface includes a user interface for displaying a time image, a multimedia object corresponding to a time point in the time image, and first information of the multimedia object corresponding to the time point; a trigger module for triggering a search process if the time image and the multimedia object corresponding to the time point in the time image overlap with each other on the user interface, wherein the search process includes searching for, based on the first information, multimedia objects corresponding to other time points in the time image related to the first information; and a display module for displaying on the user interface the multimedia objects corresponding to other time points in the time image and found in the search process.

In an exemplary embodiment, a user interface operating method is disclosed. The user interface operating method includes the following steps of displaying a time image and a multimedia object on a user interface; retrieving data in the multimedia object when a touch on the user interface is detected; and triggering a search process if the time image and the multimedia object overlap with each other on the user interface, wherein the search process includes searching for multimedia information related to the data in the multimedia object.

In an exemplary embodiment, users may use the aforementioned electronic device having the user interface or implementing the aforementioned user interface operating method to readily browse first information corresponding to multimedia objects and other multimedia objects or second information related to the first information.

BRIEF DESCRIPTION OF THE DRAWINGS

The present disclosure can be more fully understood by reading the following detailed description of the embodiments, with reference made to the accompanying drawings, wherein.

DETAILED DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
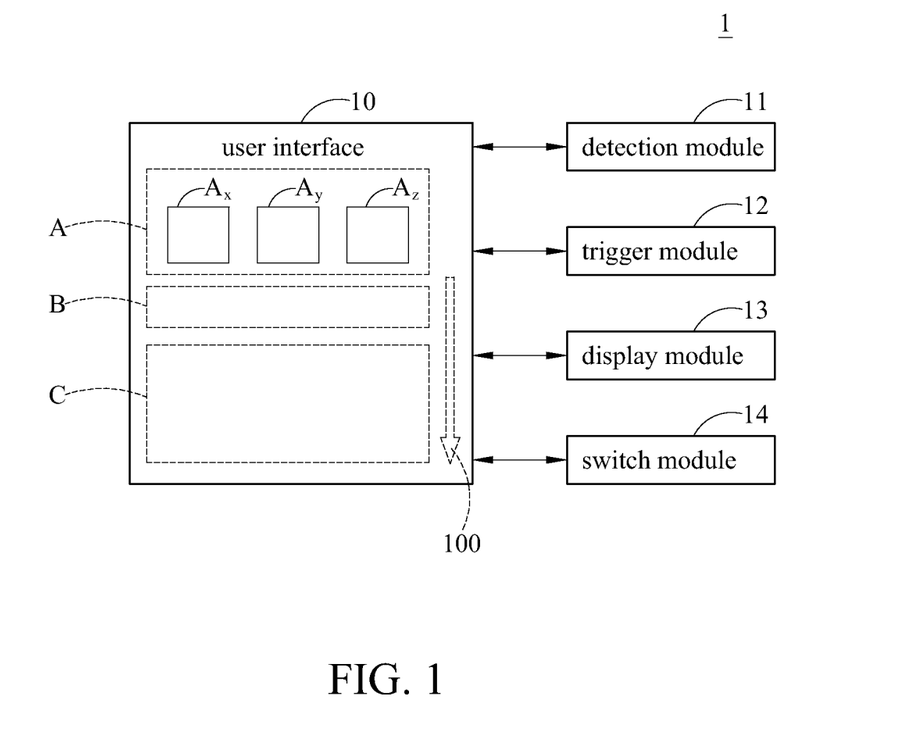
FIG. 1 is a schematic block diagram depicting an electronic device for obtaining multimedia information according to the present disclosure.

FIG. 1 shows a schematic block diagram depicting an electronic device for obtaining multimedia information according to an embodiment of the present disclosure. The electronic device 1 includes a user interface 10, a trigger module 12 and a display module 13.

The user interface 10 is used for displaying a time image, a multimedia object corresponding to a time point in the time image, and first information corresponding to the multimedia object at the time point. In FIG. 1, the user interface 10 is divided into a multimedia browsing area A, a time image area B and an information display area C. The time image area B may contain a time image of a plurality of time points, such as a time axis. The multimedia browsing area A can display multimedia objects such as $A_x$, $A_y$, or $A_z$ corresponding to various time points in the time image. The information display area C can display first information about the multimedia objects $A_x$, $A_y$ or $A_z$. In an exemplary embodiment, when any one of the multimedia objects $A_x$, $A_y$ and $A_z$ is being displayed at the center of the multimedia browsing area A, the information display area C can display the first information of the one in the center. Alternatively, the electronic device 1 may also receive a select input signal (e.g. a touch select, a cursor click or other types of input signals), so that the first information of the selected multimedia object is displayed in the information display area C of the user interface 10.

It should be noted that the multimedia objects $A_x$, $A_y$ and $A_z$ can be pictures, pictures combined with texts, pictures combined with audio or video clips retrieved from a file at the system end. System end may set up association among the time point at which the multimedia object is retrieved, the retrieved multimedia object and the first information, so that when time points are displayed in the time image area B by the user interface 10, the picture, the picture combined with texts, the picture combined with audio or the video clip retrieved at this time point can be displayed in the multimedia browsing area A, and the relevant first information can be displayed in the information display area C. The first information may be, for example, the name, a product type, a web address and the like of a particular product in the multimedia object. Moreover, the segmentations of the user interface 10 are not limited to just the multimedia browsing area A, the time image area B and the information display area C.

The trigger module 12 is used for triggering a search process when a multimedia object corresponding to a time point in the time image overlaps with the time image on the user interface 10. The search program may include searching for multimedia objects corresponding to other time points in the time image related to the first information.

More particularly, the electronic device 1 may also include a detection module 11 for detecting whether a trigger action is completed by a multimedia object corresponding to a time point in the time image and the time image, i.e. detecting whether a multimedia object corresponding to a time point in the time image overlaps with the time image on the user interface 10. If the electronic device 1 has a touch screen, the trigger action may be a user's finger selecting of any of the multimedia objects $A_x$, $A_y$ and $A_z$ in the multimedia browsing area A of the user interface 10 and dragging it to a corresponding time point in the time image area B so that the two are completely or partially overlap with each other. In addition, a cursor may also be used to select and drag one of the multimedia objects $A_x$, $A_y$ and $A_z$ in the multimedia browsing area A of the user interface 10 to a corresponding time point in the time image area B so that the two are completely or partially overlap with each other. When the trigger action is accomplished by the time image and the multimedia object corresponding to the time point in the time image, the first information of the multimedia object at the time point is read in the search process. In other words, if the detection module 11 detects that a trigger action is completed by any of the multimedia objects in the multimedia browsing area A and a corresponding time point in the time image area B, the search process is executed to read the first information of the multimedia object overlapping the time image area B. If no trigger action is detected, the search process is not executed.

The display module 13 is used for displaying on the user interface 10 the multimedia objects at other time points found in the search process. More particularly, the system end already associates the same or similar multimedia objects from a file with the first information in advance, such that based on this first information, multimedia objects at other time points related to this first information can be found and displayed on the multimedia browsing area A.

In addition, the search process includes based on the first information, searching for second information related to the first information, and outputting the found second information to the user interface 10 for display. Specifically, the first information can be used as an outline (e.g. indicating name and type) for a particular product in the corresponding multimedia object, and the system end may associate second information with the first information in advance, for example, promotion of the product or pictures of the product exhibited at other angles, to be displayed in the information display area C. Therefore, the search process triggered by the trigger module 12 includes not only searching for related multimedia objects at other time points based on the first information, but also searching for second information, which is associated with the first information and further illustrates the contents of a product in a multimedia object.

Further, as shown in FIG. 1, the user interface 10 also displays a switch object 100, and the electronic device 1 also includes a switch module 14. The switch module 14 is operated for switching between first information of different targets in the information display area C of the user interface 10 in the case that the multimedia object $A_x$, $A_y$, and $A_z$ have a plurality of targets. In addition, it should be noted that the switch object 100 is an optional element, and the first information of different targets in a multimedia objects can also be displayed in the information display area C automatically in turn.

Furthermore, the electronic device 1 includes an inspection module (not shown). The inspection module can be used to check the bandwidth or quality of communication of the electronic apparatus 1 to determine the number of multimedia objects at other time points to be displayed on the user interface 10.

It should also be noted that the electronic device 1 can be, for example, a portable electronic device such as a mobile phone, a computer or a TV. The display screen of the mobile phone can be a touch screen or an ordinary display screen.

Figure 2:
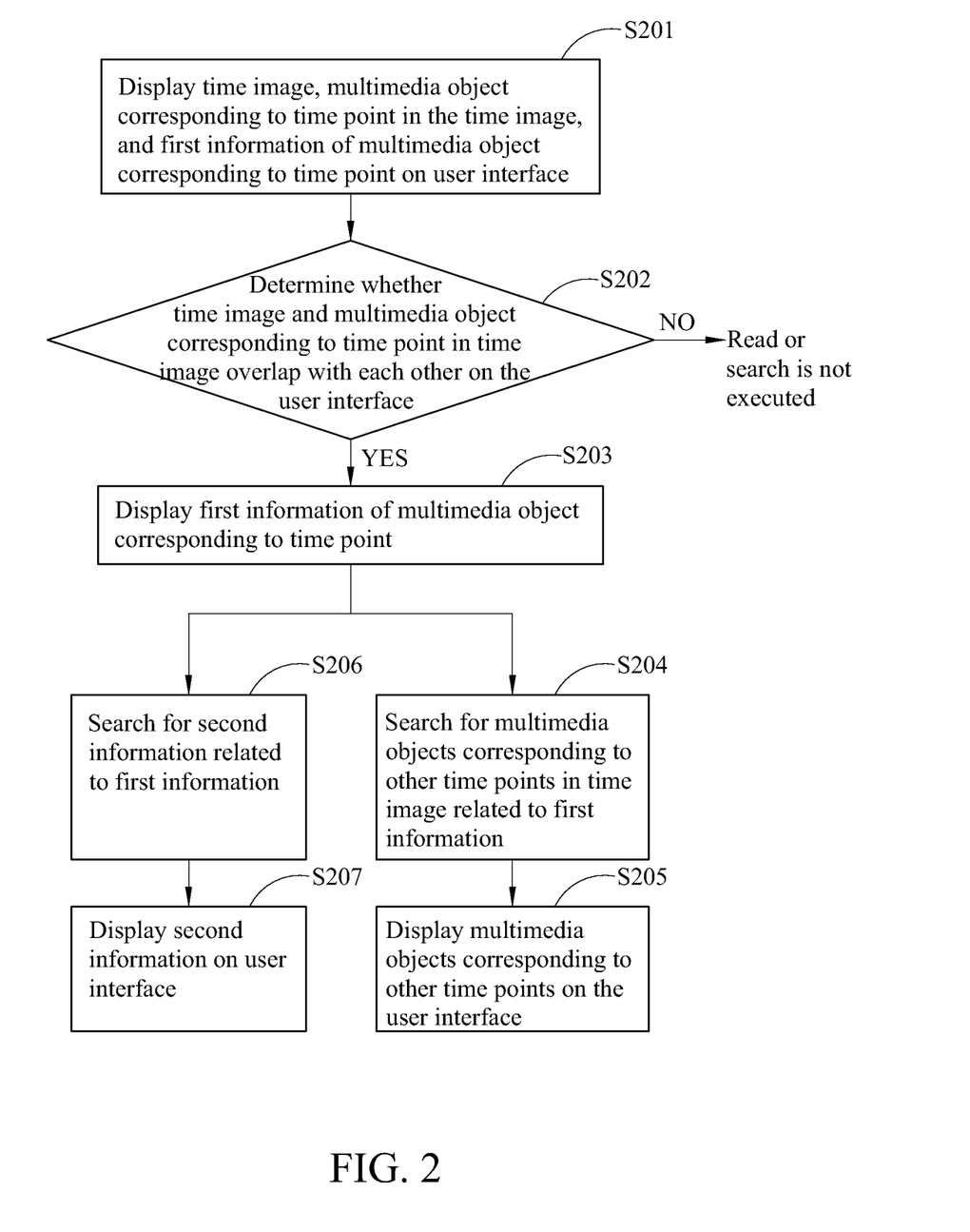
FIG. 2 is a flowchart schematically illustrating the user interface operating method for obtaining multimedia information according to the present disclosure.

FIG. 2 is a flowchart schematically illustrating the user interface operating method for obtaining multimedia information according to an exemplary embodiment of the present disclosure.

As shown in FIG. 2, in step S201, a time image, a multimedia object corresponding to a time point in the time image, and first information of the multimedia object corresponding to the time point are displayed on a user interface of an electronic device. Then, in step S202, it is determined whether the time image and the multimedia object corresponding to the time point in the time image overlap with each other on the user interface; if not, then a search process (read or search) is not executed. If the two overlap with each other, the search process is executed (steps S203 to S207).

In step S203, the first information of the multimedia object corresponding to the time point is read. It should be noted that there is no specific order between steps S204 to S205 and S206 to S207 shown in FIG. 2, and also they can be performed in parallel.

In step S204, it is performed to search for multimedia objects corresponding to other time points in the time image related to the first information, and in step S205, the multimedia objects corresponding to other time points in the time image related to the first information found are output to the user interface for display.

In step S206, it is performed to search for second information related to the first information, and in step S207, the second information found are output to the user interface for display.

Further, before displaying on the user interface the multimedia objects corresponding to other time points in the time image found by the search process, the method further includes checking the bandwidth or communication quality of the electronic device in order to determine the number of multimedia objects at other time points to be displayed on the user interface.

Moreover, the present disclosure provides a program product storing a program for operating the aforementioned user interface. When the program product is loaded onto and executed by a computer, the user interface operating method shown in FIG. 2 is executed and accomplished. In addition, the product program can also be stored on a media, such as a hard disk, ROM, PROM, VCD, DVD or other computer-readable media. Generally, the program product is usually in the form of an application available to be downloaded by smart phones. Once the application is initiated, multimedia objects such as pictures, pictures combined with texts, pictures combined with audio or video clips extracted from a show or program, the time image including the extracted time points and the first information of the extracted multimedia objects are displayed on the screen of a mobile phone. The application may also cause the mobile phone to detect whether an extracted multimedia object overlaps with the time image containing the extracted time point on the user interface. If the two overlap with each other, a search process is triggered to display extracted multimedia objects at other time points or the second information related to the first information.

FIGS. 3A to 3E are schematic diagrams depicting multimedia objects at other time points and the second information related to the first information displayed on a user interface according to an embodiment of the user interface operating method of the present disclosure.

It should be noted that a user interface 20 can be in a portable electronic device such as a mobile phone, a tablet PC and etc, a television or a computer. In addition, multimedia objects can be pictures, pictures combined with texts, pictures combined with audio or video clips.

Figure 3A:
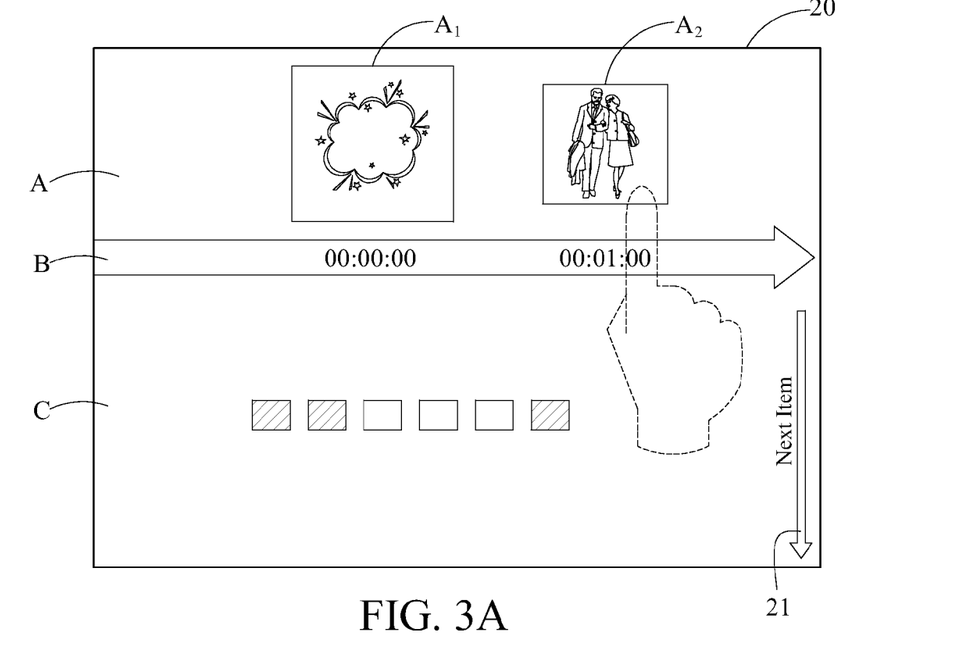
FIGS. 3A to 3E are schematic diagrams depicting multimedia objects at other time points and second information related to the first information displayed on a user interface according to an embodiment of the present disclosure.

As shown in FIG. 3A, the user interface 20 includes a multimedia browsing area A, a time image area B and an information display area C. The user interface 20 also includes a switch object 21. The multimedia browsing area A may display pictures $A_1$ and $A_2$. The time image area B may display time points of the pictures $A_1$ and $A_2$. The information display area C may display the first information of the picture $A_1$ or $A_2$. In this embodiment, the pictures $A_1$ and $A_2$ are pictures captured from a movie. For example, the picture $A_1$ may be the first image of the movie, and the picture $A_2$ may be a retrieved picture with the first information set by the system end. In FIG. 3A, the information display area C displays the first information of the picture $A_1$, such as the movie name or the program theme.

Figure 3B:
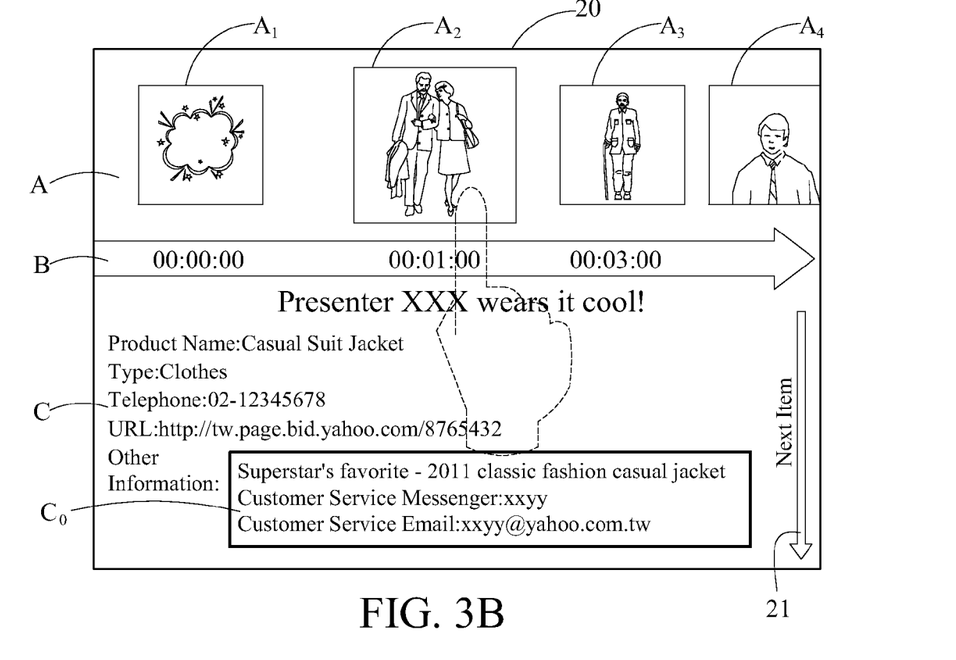

In FIG. 3B, a user selects the picture $A_2$, and then the information display area C displays the first information for the picture $A_2$, for example, the name, the type, the web address, and etc. of the clothes (e.g. a casual suit jacket) worn by a presenter appearing in the picture $A_2$, wherein the first information may include other information $C_0$.

Figure 3C:
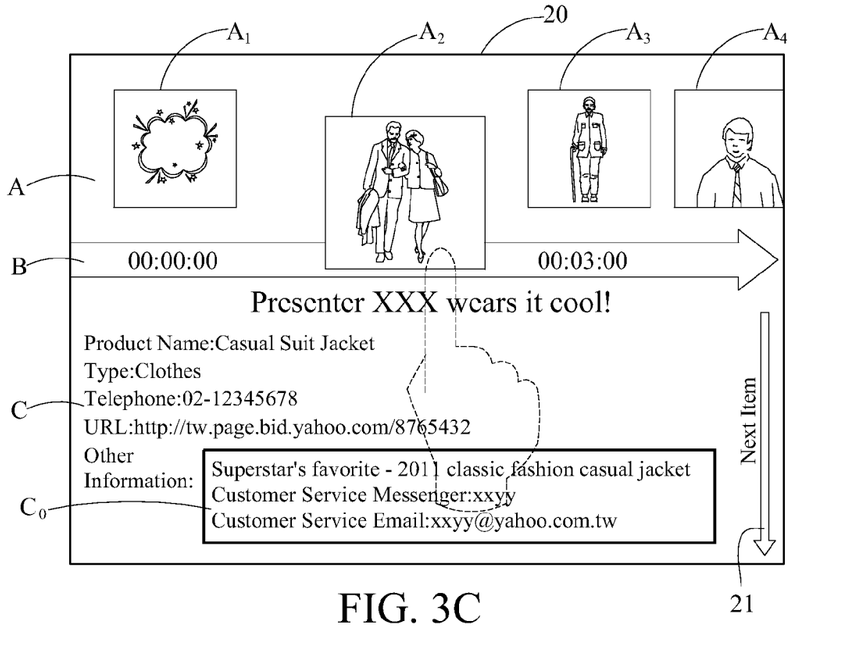
Figure 3D:
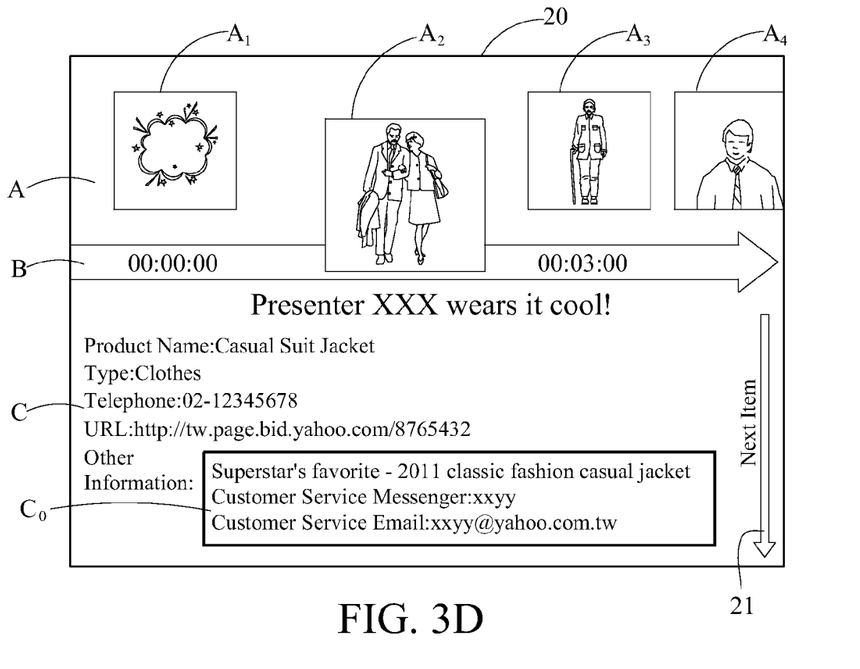

In FIGS. 3C to 3D, the user is dragging the picture $A_2$ onto the time image area B to overlap with the time point 00:01:00 which corresponds to the picture $A_2$.

Figure 3E:
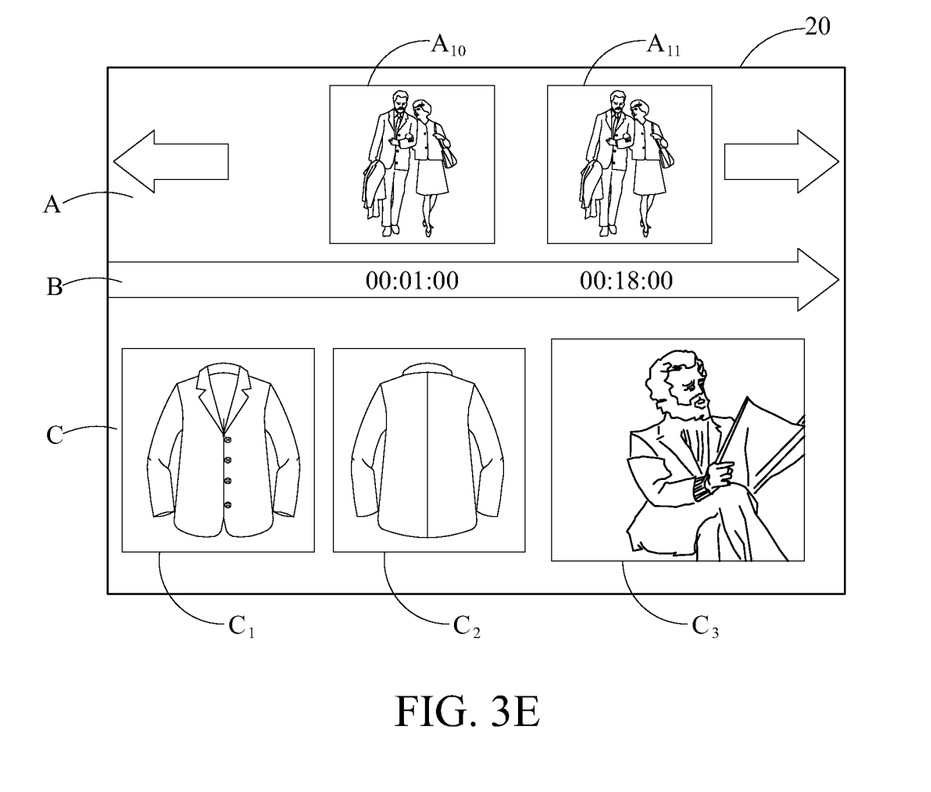

In FIG. 3E, once the picture $A_2$ overlaps with the corresponding time point in the time image area B, the multimedia browsing area A displays pictures $A_{11}$ and $A_{12}$ at other time points related to the first information (i.e. the casual suit jacket), and the information display area C displays the second information $C_1$, $C_2$ and $C_3$ related to the first information, for example, pictures showing the casual suit jacket exhibited at other angles or a model wearing the same casual suit jacket.

Figure 4A:
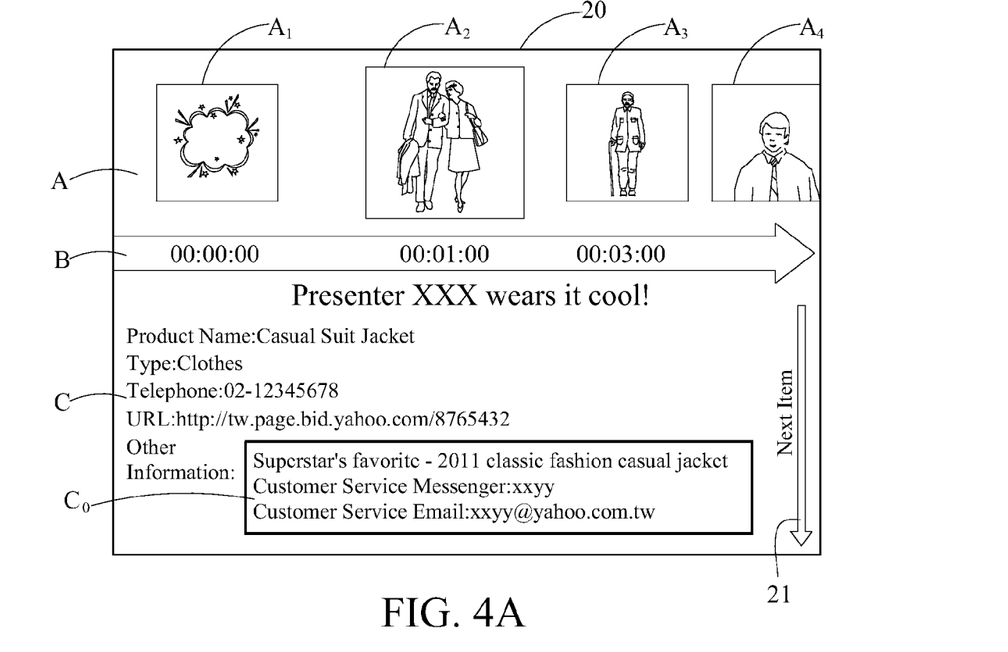
FIGS. 4A to 4C are schematic diagrams depicting switching between first information of different targets in a picture on the user interface according to an embodiment of the present disclosure.
Figure 4B:
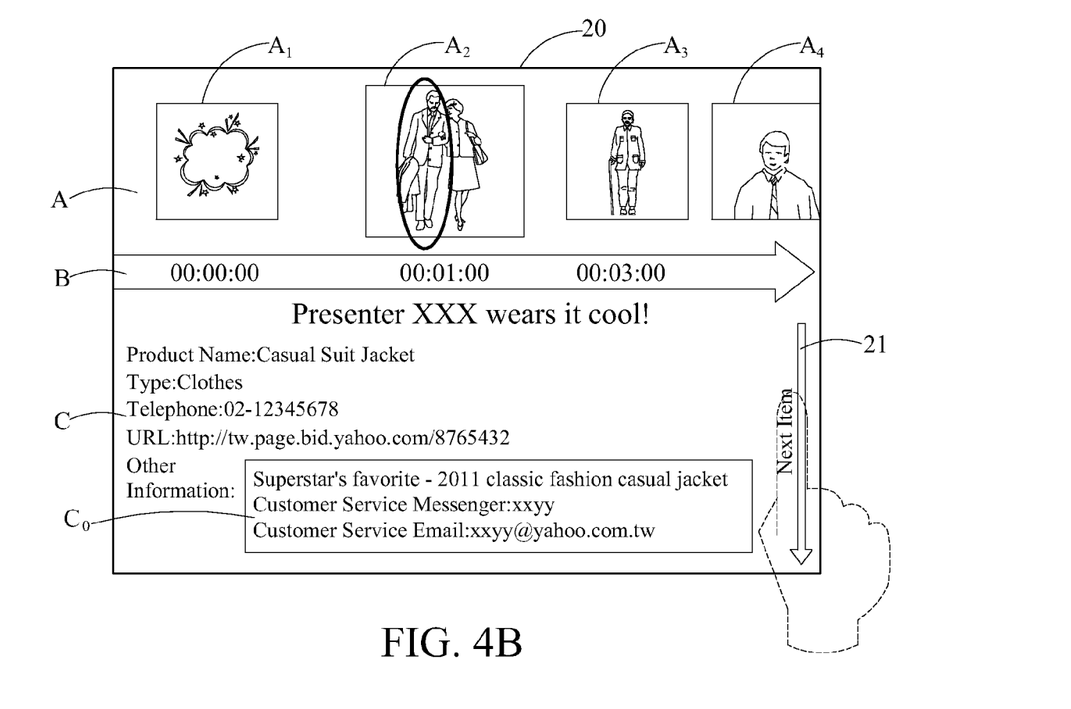
Figure 4C:
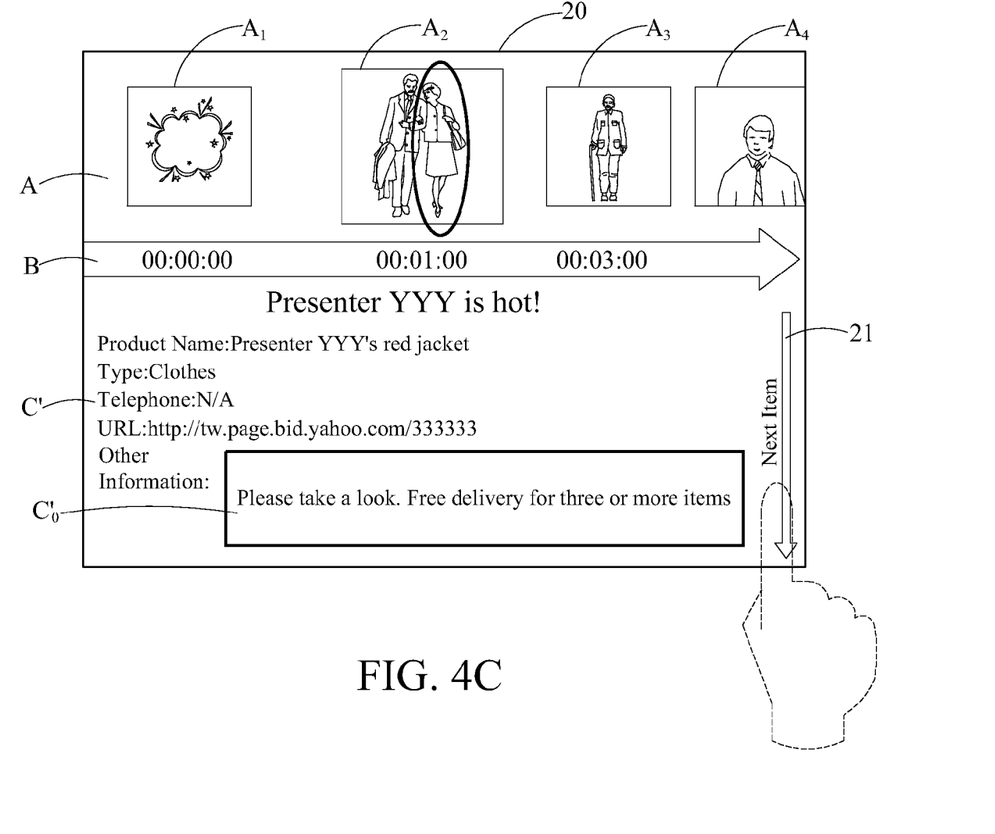

FIGS. 4A to 4C are schematic diagrams depicting switching between the first information of different targets in a picture on the user interface according to an embodiment of user interface operating method of the present disclosure.

As shown in FIGS. 4A and 4B, the information display area C displays the first information showing the clothes worn by a presenter on the left of the picture $A_2$, and then when a user operates the switch object 21, as shown in FIG. 4C, the information display area C' displays the first information of clothes worn by the presenter on the right of the picture. The first information may include other information $C_0'$.

Figure 5A:
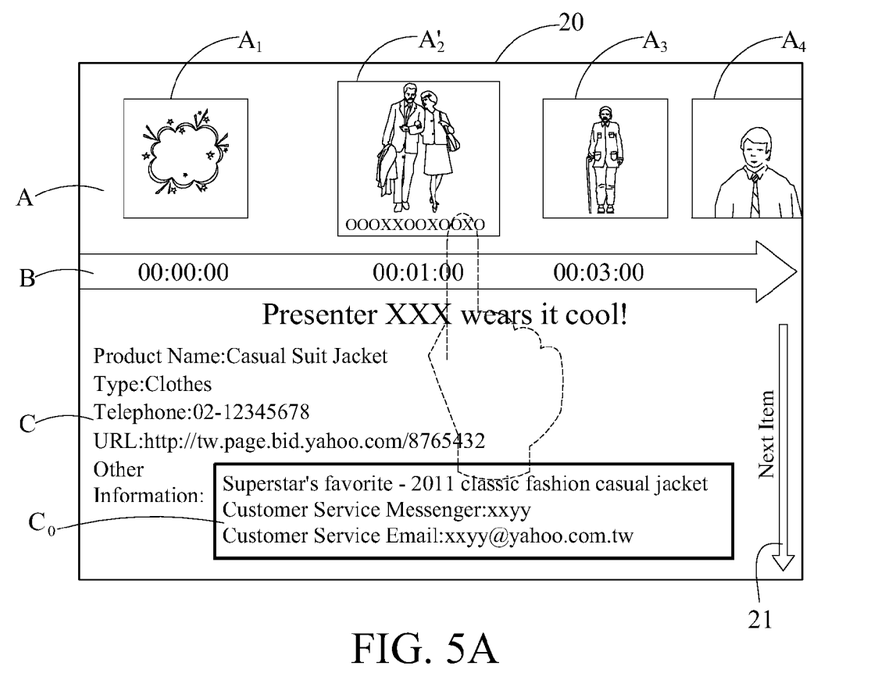
FIGS. 5A to 5C are schematic diagrams illustrating triggering of the search process due to overlapping pictures combined with texts, pictures combined with audio or video clips, respectively, with the time image according to an embodiment of the present invention.
Figure 5B:
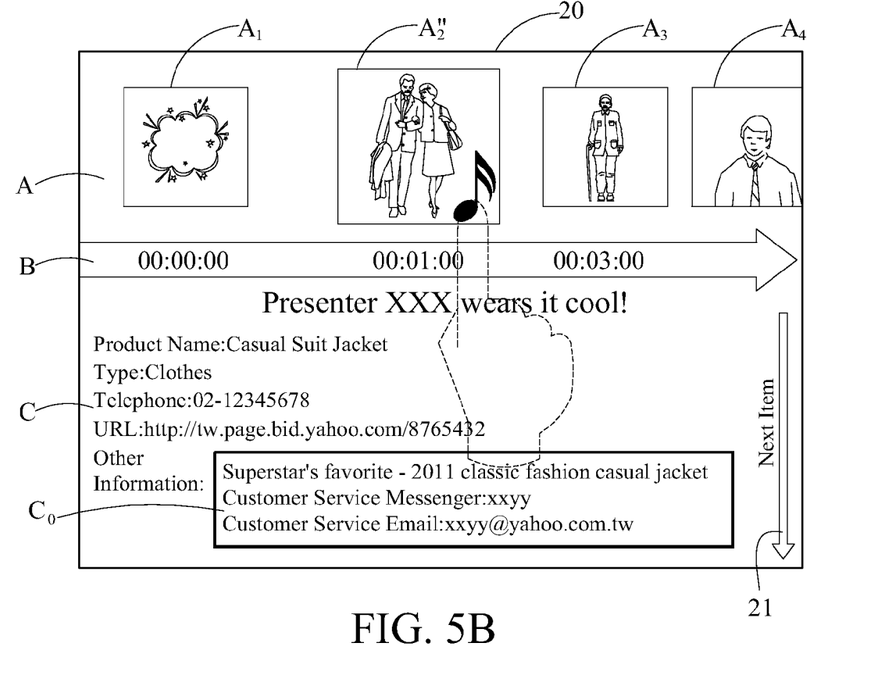
Figure 5C:
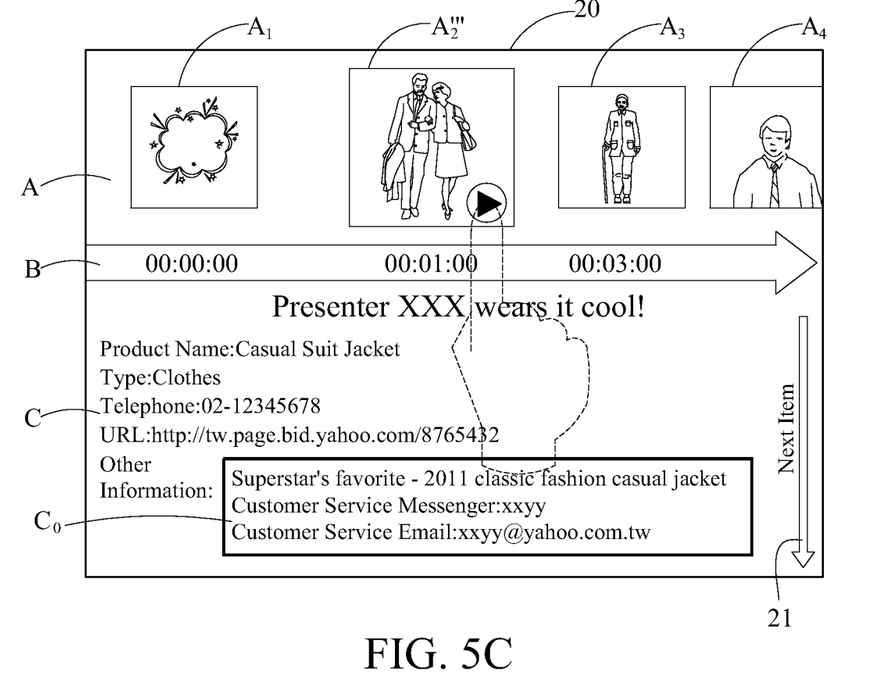

FIGS. 5A to 5C are schematic diagrams illustrating triggering of the search process caused by overlapping pictures combined with texts, pictures combined with audio or video clips, respectively, with the time image according to an embodiment of the present disclosure.

As shown in FIG. 5A, a multimedia object can be a picture combined with texts $A'_2$, and a user can drag the texts in the picture combined with texts $A'_2$ to the time image area B to overlap with the time point 00:01:00, so as to trigger the search process. Alternatively, as shown in FIG. 5B, a multimedia object can be a picture combined with audio $A''_2$, and the user can drag the musical note in the picture combined with audio A″$_2$ to the time image area B to overlap with the time point 00:01:00, so as to trigger the search process. Or, as shown in FIG. 5C, a multimedia object can be a video clip A‴$_2$, and the user can drag the video clip A‴$_2$ to the time image area B to overlap with the time point 00:01:00, so as to trigger the search process.

Figure 5D:
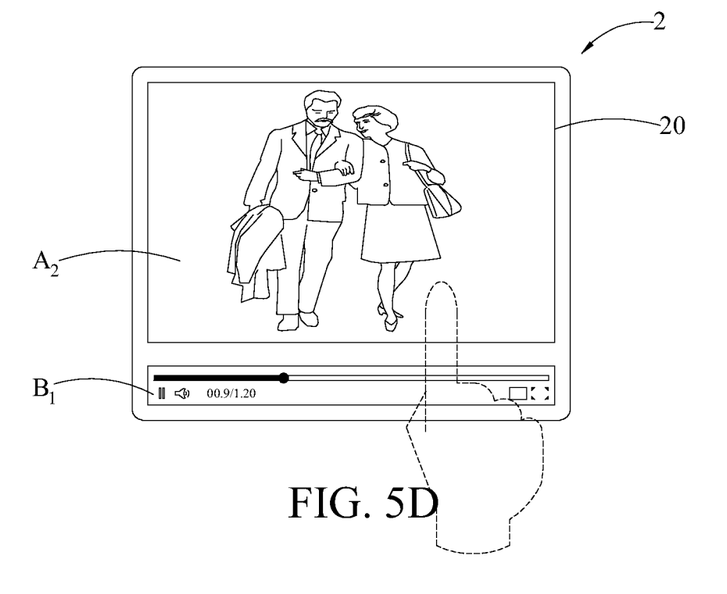
FIG. 5D is a schematic diagram illustrating the user interface operating method according to an embodiment of the present invention.

FIG. 5D is a schematic diagram illustrating the user interface operating method according to an embodiment of the present disclosure. First, a time image and a multimedia object are displayed on the user interface. Then, once a touch on the user interface is detected, data in the multimedia object are retrieved. Finally, when the time image overlaps with the multimedia object on the user interface, a search process is triggered. The search process includes searching for multimedia information related to the data in the multimedia objects.

Specifically, an electronic device 2 includes a user interface 20, on which a video played by the electronic device 2 and a playback timeline B$_1$ are displayed. When a use's hand or stylus touches the video on the user interface 20, the electronic device 2 then retrieves data in the video, such as pictures, pictures combined with texts, pictures combined with audio, video clips or the like. As shown in FIG. 5D, the retrieved data is a picture A$_2$. Then, the user may drag the picture A$_2$ to overlap with the playback timeline B$_1$, so as to trigger the search process, which includes searching for multimedia information related to the picture A$_2$.

In summary, a user interface operating method, an electronic device with the user interface and program product storing a program for operating the user interface are disclosed. By detecting overlap of the time image and an multimedia object on the user interface, a search process can be triggered to search for multimedia objects at other time points or the second information related to the first information, and the multimedia objects at other time points or the second information found by the search process can then be displayed on the user interface. Therefore, when implementing embedded marketing, the system end can define first information associated with multimedia objects retrieved in a video or program in advance. When a user makes a multimedia object to come in contact with the time image, the electronic device can then search for other associated multimedia objects or second information based on the first information. As such, while the video or program is in progress, the user can readily browse multimedia information provided by the system end through the user interface operating method and the electronic device with the user interface.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A user interface operating method, comprising the following steps of:
   by a user interface of an electronic device a time line, a frame in a video corresponding to a time point in the time line, and first information of an object in the frame;
   triggering, by a processor, a search process when at least one of the time line and the frame is dragged to be in contact with one another on the user interface, wherein the search process includes searching for, based on the first information, other frames in the video corresponding to other time points in the time line, each of the other frames having a same object as the object in the frame; and
   displaying, by the user interface, the other frames in the video having the same object and corresponding to the other time points in the time line.

2. The user interface operating method of claim 1, wherein the search process further includes searching for, based on the first information, second information related to the first information.

3. The user interface operating method of claim 2, further comprising displaying the second information found in the search process on the user interface.

4. The user interface operating method of claim 1, further comprising the step of, before displaying on the user interface the other frames in the video corresponding to the other time points in the time line, checking bandwidth or communication quality of the electronic device in order to determine the number of the other frames to be displayed on the user interface.

5. The user interface operating method of claim 1, wherein the user interface displays a switch object.

6. The user interface operating method of claim 5, further comprising the step of, when the frame has a plurality of objects, switching between the first information of different objects in the frame displayed on the user display through the switch object.

7. The user interface operating method of claim 1, wherein the frame is a picture, a picture combined with texts, a picture combined with audio or a video clip in the video.

8. A program product, stored on a non-transitory computer-readable medium, storing instructions for operating a user interface, when being loaded and executed by a processor, the processor performing the user interface operating method of claim 1.

9. An electronic device, comprising:
   configured to display a time line, a frame in a video corresponding to a time point in the time line, and first information of an object in the frame; and
   a processor configured to trigger a search process when at least one of the time line and the frame is dragged to be in contact with one another on the user interface, wherein the search process includes searching for, based on the first information, other frames in the video corresponding to other time points in the time line each of the other frames having a same object as the object in the frame; and
   a display module for displaying the user interface configured to display the other frames in the video having the same object and corresponding to the other time points in the time line.

10. The electronic device of claim 9, wherein the search process further includes searching for, based on the first information, second information related to the first information, and the user interface further displays on the user interface the second information found in the search process.

11. The electronic device of claim 9, wherein the user interface further displays a switch object.

12. The electronic device of claim 11, further comprising a switch module for, when the frame has a plurality of objects and the switch object is operated, switching between the first information of different objects in the frame displayed on the user display through the switch object.

13. The electronic device of claim 9, further comprising an inspection module for checking the bandwidth or communication quality of the electronic device in order to determine the number of the other frames to be displayed on the user interface.

14. A user interface operating method, comprising the following steps of:
- displaying, by a user interface, a time line and a video;
- by a processor, a frame in the video corresponding to a time point of the time line when a touch on the user interface is detected, wherein the frame has an object; and
- triggering, by the processor, a search process when at least one of the time line and the frame is dragged to be in contact with one another on the user interface, the search process including searching for other frames in the video corresponding to other time points in the time line, wherein each of the other frames has a same object as the object in the frame.

15. A program product, stored on a non-transitory computer-readable medium, storing instructions a for operating a user interface, when being loaded and executed by a processor, the processor performing the user interface operating method of claim 14.

* * * * *